US011976623B2

(12) United States Patent
Lee

(10) Patent No.: US 11,976,623 B2
(45) Date of Patent: May 7, 2024

(54) ENERGY CONVERTING APPARATUS, ENERGY CONVERTING SYSTEM INCLUDING SAME, AND OPERATING METHOD THEREOF

(71) Applicant: CYTRONIQ CO., LTD, Cheonan (KR)

(72) Inventor: Michael MyungSub Lee, Cheonan (KR)

(73) Assignee: CYTRONIQ CO., LTD, Cheonan (KR)

( * ) Notice: Subject to any disclaimer, the term of this patent is extended or adjusted under 35 U.S.C. 154(b) by 1357 days.

(21) Appl. No.: 16/610,494

(22) PCT Filed: Dec. 4, 2017

(86) PCT No.: PCT/KR2017/014077
§ 371 (c)(1),
(2) Date: Feb. 20, 2020

(87) PCT Pub. No.: WO2018/105969
PCT Pub. Date: Jun. 14, 2018

(65) Prior Publication Data
US 2020/0248666 A1 Aug. 6, 2020

(30) Foreign Application Priority Data

Dec. 8, 2016 (KR) .................. 10-2016-0167063
Dec. 15, 2016 (KR) .................. 10-2016-0171948

(51) Int. Cl.
*F03D 7/02* (2006.01)
*F03B 3/12* (2006.01)

(52) U.S. Cl.
CPC ............ *F03B 3/123* (2013.01); *F03D 7/0224* (2013.01)

(58) Field of Classification Search
CPC . F03D 7/02; F03D 7/06; F03D 7/0224; F03D 7/0256; F03D 7/022; F03D 7/0232;
(Continued)

(56) References Cited

U.S. PATENT DOCUMENTS 7,931,445 B2 * 4/2011 Haans .................... F03D 80/55
416/1
2008/0086281 A1 * 4/2008 Santos .................. F03D 7/0292
700/32
(Continued)

FOREIGN PATENT DOCUMENTS

KR 10-2001-0067856 A 7/2001
KR 10-2012-0061336 A 6/2012
(Continued)

*Primary Examiner* — David E Sosnowski
*Assistant Examiner* — Maxime M Adjagbe
(74) *Attorney, Agent, or Firm* — Min Gyu Song

(57) ABSTRACT

Disclosed is an energy converting apparatus for converting mechanical energy obtained by a fluid flow into electric energy. The energy converting apparatus comprises: a blade; a measuring device for measuring reaction of the blade when the fluid flow exerts an external force on the blade, and generating a measurement value corresponding to a measurement result; a memory for storing control values; a controller for reading a first control value among the control values from the memory in response to the measurement value output from the measuring device, and generating a control signal by using the first control value; and an actuator for changing a three-dimensional shape of the blade in response to the control signal output from the controller.

20 Claims, 17 Drawing Sheets

(58) Field of Classification Search
CPC ........ F03D 7/0276; F03D 7/048; F03D 3/062; F05B 11/00
See application file for complete search history.

(56) References Cited

U.S. PATENT DOCUMENTS

| | | | | |
|---|---|---|---|---|
| 2013/0280067 | A1* | 10/2013 | Goodman | F03D 7/0232 416/1 |
| 2015/0211486 | A1* | 7/2015 | de Boer | F03D 9/257 290/44 |
| 2015/0219075 | A1* | 8/2015 | Cardinal | F03D 7/00 290/44 |
| 2015/0263521 | A1* | 9/2015 | Garcia | H02J 3/18 307/52 |
| 2015/0292477 | A1* | 10/2015 | Kratmann | F03D 1/0675 416/232 |
| 2015/0308416 | A1* | 10/2015 | Ambekar | F03D 7/048 700/287 |

FOREIGN PATENT DOCUMENTS

| | | |
|---|---|---|
| KR | 10-2012-0090760 A | 8/2012 |
| KR | 10-2013-0116152 A | 10/2013 |
| WO | WO 2005-095793 A1 | 10/2005 |

\* cited by examiner

Figure 3

LUT1

| Measurement target and measured value | | | | | | | Control targets and control values | | |
|---|---|---|---|---|---|---|---|---|---|
| Wind direction / wind speed | Stress / load | Displacement | Cumulative fatigue life | Cumulative UV Light | Residual life span | Electrical power Production amount | Pitch Angle | Leading edge | Trailing edge |
| M1 | L1 | D1 | F1 | U1 | R1 | P01 | PA1 | LE1 | TE1 |
| M2 | L2 | D2 | F2 | U2 | R2 | P02 | PA2 | LE2 | TE2 |

Figure 4

LUT2

| Measurement target and measured value | Control targets and control values | | | |
|---|---|---|---|---|
| Restoration force / elastic force / aeroelasticity / fatigue load / vibration / strain force / gravity / buoyancy / rotational speed / pitch angle / strain / acceleration / ultraviolet rays / insolation / wind speed / temperature / humidity | Blade position | Pitch angle | Leading edge | Trailing edge |
| | BP1 | PA1-1 | LE1-1 | TE1-1 |
| | BP2 | PA1-2 | LE1-2 | TE1-2 |

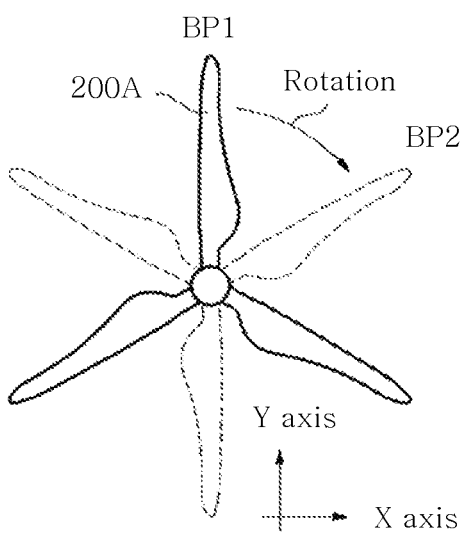

Figure 5

LUT3

| Measurement target and measured value | | Reference value | Control targets and control values | | |
|---|---|---|---|---|---|
| Restoration force / elastic force / aeroelasticity / fatigue load / vibration / strain force / gravity / buoyancy / rotational speed / pitch angle / strain / acceleration / ultraviolet rays / insolation / wind speed / temperature / humidity | Blade position | Cumulative Power Production | Pitch angle | Leading edge | Trailing edge |
| | BP1 | | PA1-3 | LE1-3 | TE1-3 |
| | BP2 | | PA1-4 | LE1-4 | TE1-4 |
| | BP1 | | PA1-5 | LE1-5 | TE1-5 |
| | BP2 | | PA1-6 | LE1-6 | TE1-6 |

Figure 6

LUT4

| Measurement target and measured value | Reference value | | Control targets and control values | | |
|---|---|---|---|---|---|
| Restoration force / elastic force / aeroelasticity / fatigue load / vibration / strain force / gravity / buoyancy / rotation speed / pitch angle / strain / acceleration / ultraviolet dose / insolation / wind speed / temperature / humidity | Blade position | Terrain info / weather info / locational info | Pitch angle | Leading edge | Trailing edge |
| | BP1 | | PA1-7 | LE1-7 | TE1-7 |
| | BP2 | | PA1-8 | LE1-8 | TE1-8 |
| | BP1 | | PA1-9 | LE1-9 | TE1-9 |
| | BP2 | | PA1-10 | LE1-10 | TE1-10 |

Figure 7

LUT5

| Measurement target and measured value | Location Information | Terrain Information | Weather Information | Parts Status | Control targets and control values | | |
|---|---|---|---|---|---|---|---|
| Restoration force / elastic force / aeroelasticity / fatigue load / vibration / strain force / gravity / buoyancy / rotation speed / pitch angle / strain rate / acceleration / ultraviolet dose / insolation / wind speed / temperature / humidity | | | | | Pitch Angle | Reading Edge | Trailing edge |
| MV1 | P1 | T1 | W1 | S1 | PA3 | LE3 | TE3 |
| MV2 | P2 | T2 | W2 | S2 | PA4 | LE4 | TE4 |

Figure 8

LUT6

| Measurement target and measured value | | Reference value | | | | Control targets and control values | | |
|---|---|---|---|---|---|---|---|---|
| Restoration force / elastic force / aeroelasticity / fatigue load / vibration / strain force / gravity / buoyancy / rotation speed / pitch angle / strain rate / acceleration / ultraviolet dose / insolation / wind speed / temperature / humidity | Blade position | Terrain Information | Weather Information | Location Information | | Pitch Angle | Reading Edge | Trailing edge |
| | | | | | P1-1 | PA3-1 | LE3-1 | TE3-1 |
| | | | | | P1-2 | PA3-2 | LE3-2 | TE3-2 |
| | | | | | P1-1 | PA3-3 | LE3-3 | TE3-3 |
| | | | | | P1-2 | PA3-4 | LE3-4 | TE3-4 |
| | | | | | P1-1 | PA3-5 | LE3-5 | TE3-5 |
| | | | | | P1-2 | PA3-6 | LE3-6 | TE3-6 |
| | | | | | P1-1 | PA3-7 | LE3-7 | TE3-7 |
| | | | | | P1-2 | PA3-8 | LE3-8 | TE3-8 |
| | | | | | P1-1 | PA3-9 | LE3-9 | TE3-9 |
| | | | | | P1-2 | PA3-10 | LE3-10 | TE3-10 |
| | | | | | P1-1 | PA3-11 | LE3-11 | TE3-11 |
| | | | | | P1-2 | PA3-12 | LE3-12 | TE3-12 |
| | | | | | P1-1 | PA3-13 | LE3-13 | TE3-13 |
| | | | | | P1-2 | PA3-14 | LE3-14 | TE3-14 |
| | | | | | P1-1 | PA3-15 | LE3-15 | TE3-15 |
| | | | | | P1-2 | PA3-16 | LE3-16 | TE3-16 |

Figure 11

LUT7

| Input value | | | | Control targets and control values | | |
|---|---|---|---|---|---|---|
| Wind power value | Terrain information | Weather information | Location Information | Pitch angle | Leading edge | Trailing edge |
| | | | P1-1 | PA3-1 | LE3-1 | TE3-1 |
| | | | P1-2 | PA3-2 | LE3-2 | TE3-2 |
| | | | P1-1 | PA3-3 | LE3-3 | TE3-3 |
| | | | P1-2 | PA3-4 | LE3-4 | TE3-4 |
| | | | P1-1 | PA3-5 | LE3-5 | TE3-5 |
| | | | P1-2 | PA3-6 | LE3-6 | TE3-6 |
| | | | P1-1 | PA3-7 | LE3-7 | TE3-7 |
| | | | P1-2 | PA3-8 | LE3-8 | TE3-8 |
| | | | P1-1 | PA3-9 | LE3-9 | TE3-9 |
| | | | P1-2 | PA3-10 | LE3-10 | TE3-10 |
| | | | P1-1 | PA3-11 | LE3-11 | TE3-11 |
| | | | P1-2 | PA3-12 | LE3-12 | TE3-12 |
| | | | P1-1 | PA3-13 | LE3-13 | TE3-13 |
| | | | P1-2 | PA3-14 | LE3-14 | TE3-14 |
| | | | P1-1 | PA3-15 | LE3-15 | TE3-15 |
| | | | P1-2 | PA3-16 | LE3-16 | TE3-16 |

ENERGY CONVERTING APPARATUS, ENERGY CONVERTING SYSTEM INCLUDING SAME, AND OPERATING METHOD THEREOF

CROSS-REFERENCE TO RELATED APPLICATIONS

This application is a National Phase of the International Application No. PCT/KR2017/014077 filed on Dec. 4, 2017, which is based on Korean Application No. 10-2016-0167063 filed on Dec. 8, 2016 and Korean Application No. 10-2016-0171948 filed on Dec. 15, 2016. The applications are incorporated herein by reference.

TECHNOLOGY FIELD

Embodiments according to the concepts of the present invention relate to an energy conversion device, in particular, when the fluid flow is applied to the turbine by an external force, measuring the response of the turbine, generating a measurement value corresponding to the measurement result, and control related to the measurement value An energy conversion device capable of modifying the three-dimensional shape of the turbine based on a signal, a method of operating the same, and an energy conversion system including the energy conversion device are provided.

BACKGROUND TECHNOLOGY

Energy harvesting refers to a technology that harvests energy by converting energy from natural energy sources such as wind, tidal, or wave power into electrical energy.

For example, wind generators that convert wind energy into mechanical energy using devices such as wind turbines, which use this energy to generate electricity by turning generators, are used as means for producing electricity in many countries.

Controlling the blades of the wind generator to produce a lot of electricity can increase the load on the wind generator, and increasing the number of wind generators reduces the strength of the wind the wind generator receives.

DETAILED DESCRIPTION OF THE INVENTION

Technical Challenge

The technical problem to be achieved by the present invention is to generate a control signal corresponding to the turbine's response to the external force when the fluid flow is applied to the external force of the turbine, and to generate the three-dimensional shape of the turbine using the control signal. To provide a deformable energy conversion device and a method of operating the same.

The technical problem to be achieved by the present invention relates to an energy conversion system, by using the position information of the energy conversion device, the topographic information of the installed area of the energy conversion system including the energy conversion device, and the weather information of the area It is to provide a technology that can change the three-dimensional shape of each of the blades included in the energy conversion device.

Problem Resolving Solution

According to an embodiment of the present invention, an energy conversion device for converting mechanical energy obtained from a fluid flow into electrical energy measures a blade and a response of the blade when the fluid flow is applied to the blade by an external force. A first measurement device for generating a first measurement value corresponding to a result, a memory for storing control values, a first of the control values from the memory in response to the first measurement value output from the first measurement device; And a controller configured to read a control value and generate a control signal using the first control value, and an actuator to deform the three-dimensional shape of the blade in response to the control signal output from the controller.

According to an embodiment of the present invention, an energy conversion device for converting mechanical energy obtained from a fluid flow into electrical energy measures a blade and a response of the blade when the fluid flow is applied to the blade by an external force. A measuring device for generating a first measured value corresponding to a result of?, A controller for generating a control signal using the first measured value output from the first measuring device, and a response to the control signal output from the controller; It includes an actuator for deforming the three-dimensional shape of the blade.

The energy conversion device further comprises a memory for storing a computational fluid dynamics (CFD) program, the controller executes the CFD program stored in the memory, and causes the CFD program to cause the first measured value. To generate the control signal.

According to an embodiment of the present invention, an energy conversion device for converting mechanical energy obtained from a fluid flow into electrical energy measures a blade and a response of the blade when the fluid flow is applied to the blade by an external force. Storing control values corresponding to a combination of measuring devices for generating measured values corresponding to a result of the first value and first values representing an internal environment of the energy conversion device and second values representing an external environment of the energy conversion device. A controller that reads a control value of any one of the control values from the memory in response to the memory and the measurement values output from the measuring devices, and generates a control signal in response to the read one control value And tertiary of the blade in response to the control signal output from the controller. And an actuator that deforms the circular shape.

Wind power generation system according to an embodiment of the present invention is a first wind power generator including a first blade and a first actuator, a second wind power generator including a second blade, a measuring unit for measuring wind power and generating wind value And a memory for storing control values, a controller reading a first control value from among the control values from the memory in response to the wind power value output from the measuring instrument, and generating a control signal in response to the read first control value. Includes, the first actuator deforms the three-dimensional shape of the first blade in response to the control signal output from the controller.

According to an embodiment of the present invention, a wind power generation system includes a first wind power generator including a first blade and a first actuator, a second wind power generator including a second blade, a memory to store control values, and the first wind power generator. A receiver for receiving at least one of weather information around a wind generator, topographic information of a location where the first wind power generator is installed, and position information on a position where the second wind power generator is installed; and at least one output from the receiver. In response to selecting a first control value from the memory and generating a control signal in response to the first control value, wherein the first actuator responds to the control signal output from the controller. To deform the three-dimensional shape of the first blade.

According to an exemplary embodiment of the present invention, a method of operating an energy conversion device for converting mechanical energy obtained from a fluid flow into electrical energy includes measuring a response of the blade when the fluid flow is applied to the blade by an external force. Generating a measurement value corresponding to the measurement result, and the controller reads a first control value from among control values from a memory in response to the measurement value output from the measurement device, and uses the first control value. Generating a control signal, and an actuator deforming the three-dimensional shape of the blade in response to the control signal output from the controller.

Each of the control values stored in the memory includes at least one of weather information around the energy conversion device, terrain information of a location where the energy conversion device is installed, and location information on a location where the energy conversion device and another energy conversion device are installed. According to different values.

According to an embodiment of the present invention, a method of operating a wind power generation system including a first wind power generator including a first blade and a first actuator and a second wind power generator including a second blade includes measuring the wind power and measuring the wind power. Generating a value, the controller reading a first control value among control values stored in a memory in response to the wind power value output from the measuring instrument, and generating a control signal using the read first control value; And deforming the three-dimensional shape of the first blade by the first actuator in response to the control signal output from the controller.

The deforming of the three-dimensional shape of the first blade may be performed by the actuator in response to the control signal. The pitch angle of the blade, opening and closing of a leading edge included in the first blade, or trailing included in the first blade may be determined. The opening and closing of the edges are controlled to deform the three-dimensional shape of the first blade.

According to an embodiment of the present invention, a method of operating a wind power generation system including a first wind power generator including a first blade and a first actuator and a second wind power generator including a second blade includes a controller configured to store control values in a memory. Storing at least one of weather information around the first wind power generator, terrain information on a location where the first wind power generator is installed, and location information on a location where the second wind power generator is installed; The controller selecting a first control value from the control values stored in the memory in response to the at least one output from the receiver, and generating a control signal in response to the first control value; An actuator deforms the three-dimensional shape of the first blade in response to the control signal output from the controller. It includes the system.

The operation method of the wind power generation system further includes the step of calculating, by the controller, the accumulated power generation amount of the first wind power generator, and the controller updating each of the control values according to the calculated power generation amount.

The Effects of the Invention

An energy conversion device according to embodiments of the present invention measures the response of the turbine to the external force when a fluid flow acts as an external force on the turbine, generates a measured value according to a measurement result according to the measured value, and has the effect of changing the three-dimensional shape of the turbine based on the measured value.

Therefore, the energy converter has an effect of improving the energy conversion efficiency of the energy converter without significantly increasing the load on the energy converter.

The energy conversion device may deform the three-dimensional shape of the turbine included in the energy conversion device by using the position information indicating the position of another energy conversion device, so that the fluid flow used in the energy conversion device is different from the other energy conversion device. Since it can be transmitted to the device a lot, there is an effect that the energy conversion efficiency of the other energy conversion device is improved, there is an effect that can reduce the separation distance between the energy conversion devices.

An energy conversion apparatus according to embodiments of the present invention is included in the energy conversion apparatus using at least one of terrain information, weather information, and location information of the energy conversion device and another energy conversion device for an area where an energy conversion system is installed. Since the three-dimensional shape of each of the turbines can be modified, there is an effect of improving the energy conversion efficiency of the turbine adaptively to the surrounding environment in which the energy conversion device is installed.

Figure 1:
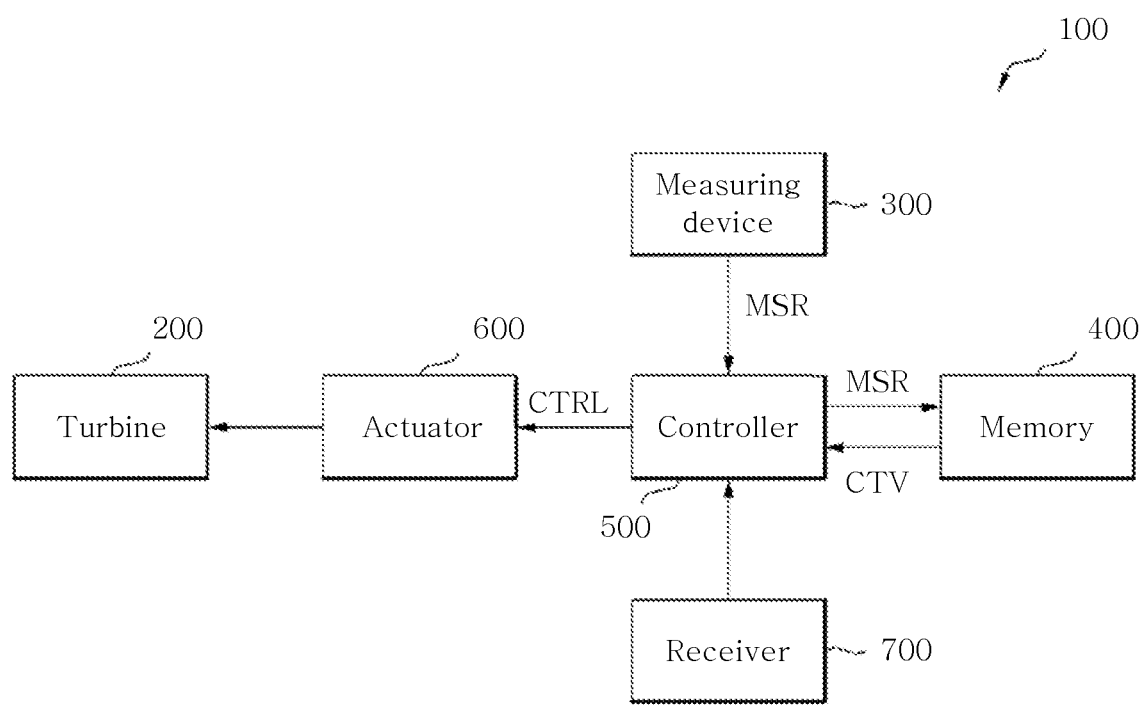
FIG. 1 is a block diagram of an energy conversion device according to embodiments of the present invention.
Figure 2:
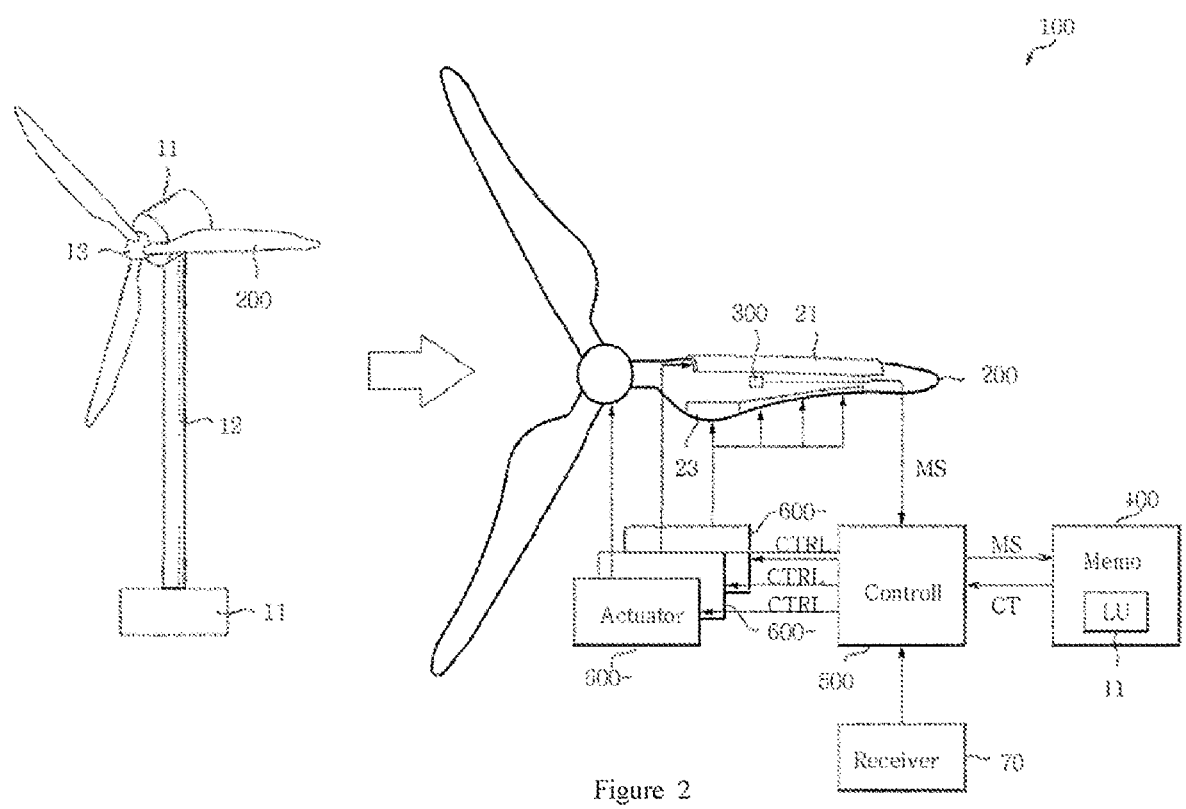
FIG. 2 is a diagram illustrating an embodiment of the energy conversion device illustrated in FIG. 1.

3 to 8 illustrate an embodiment of control objects and control values stored in the memory illustrated in FIG. 1 or 2.

Figure 9:
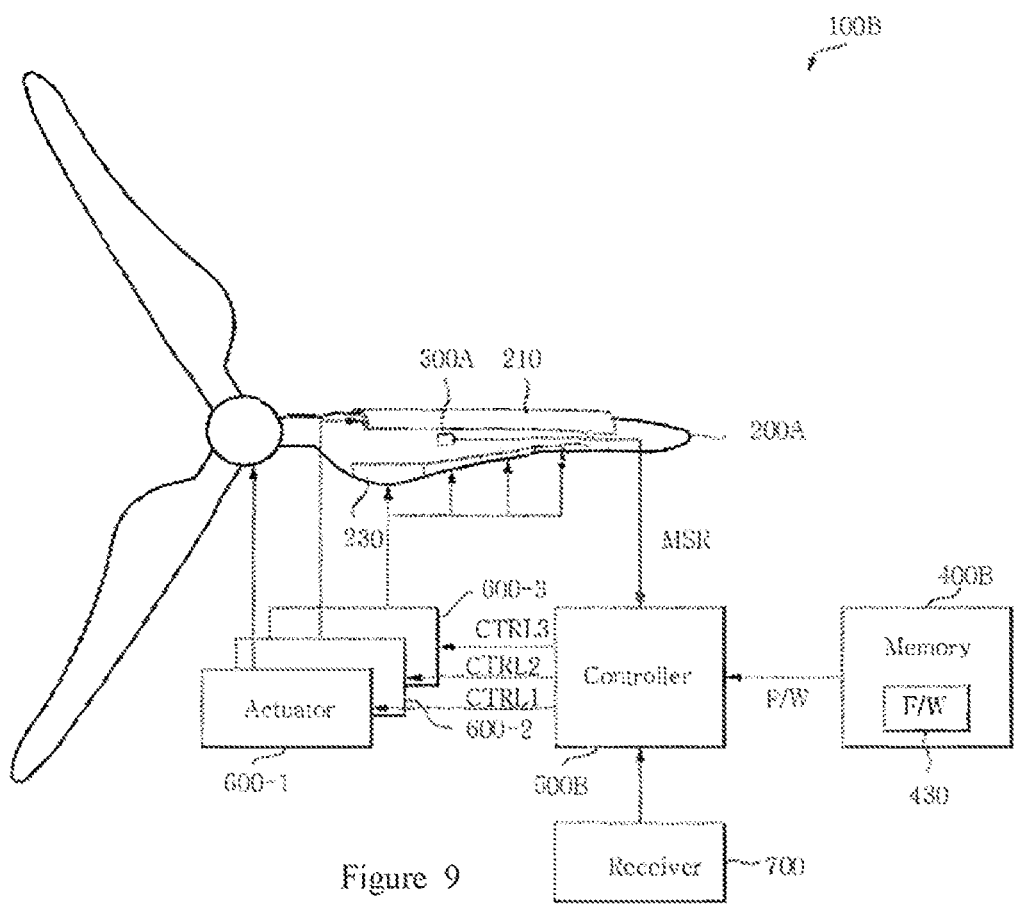

FIG. 9 is a diagram illustrating another embodiment of the energy conversion device illustrated in FIG. 1.

10 shows a conceptual diagram of an energy conversion system according to embodiments of the present invention.

Figure 10:
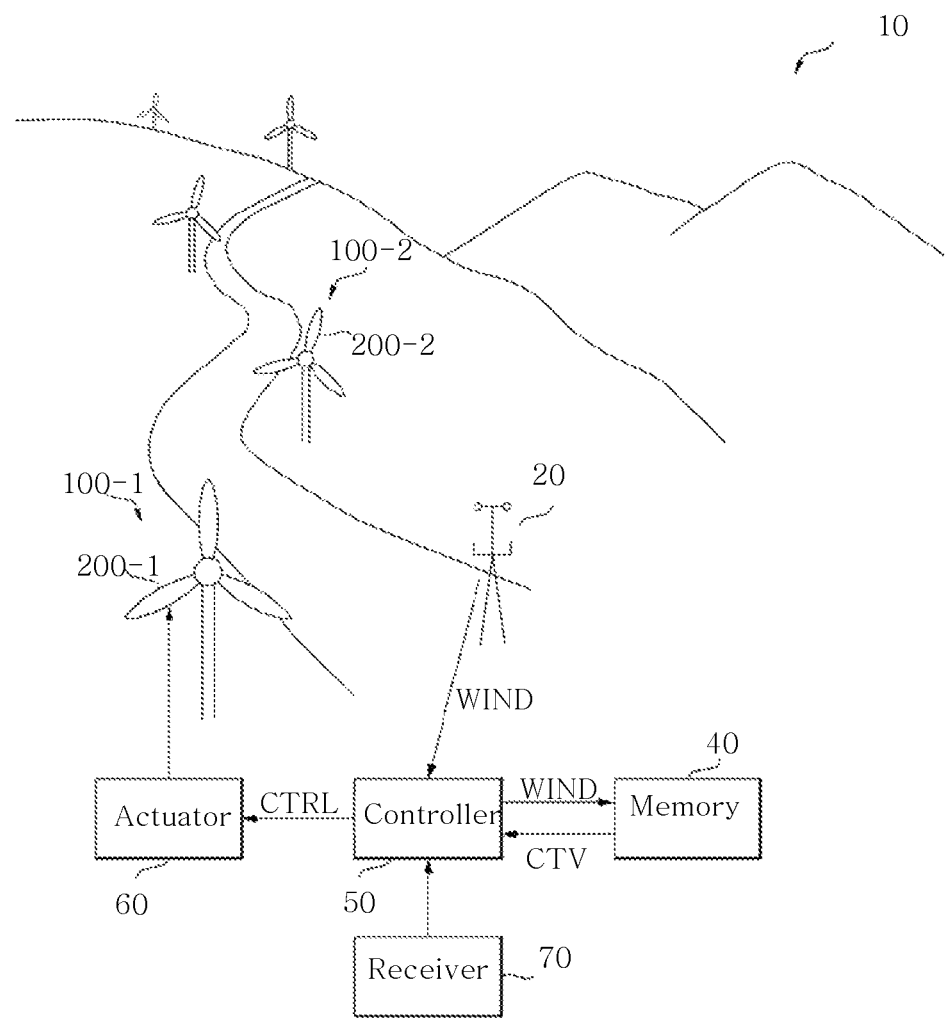

FIG. 11 illustrates an embodiment of control objects and control values stored in the memory illustrated in FIG. 10.

12 illustrates a conceptual diagram of an energy conversion system according to embodiments of the present invention.

Figure 12:
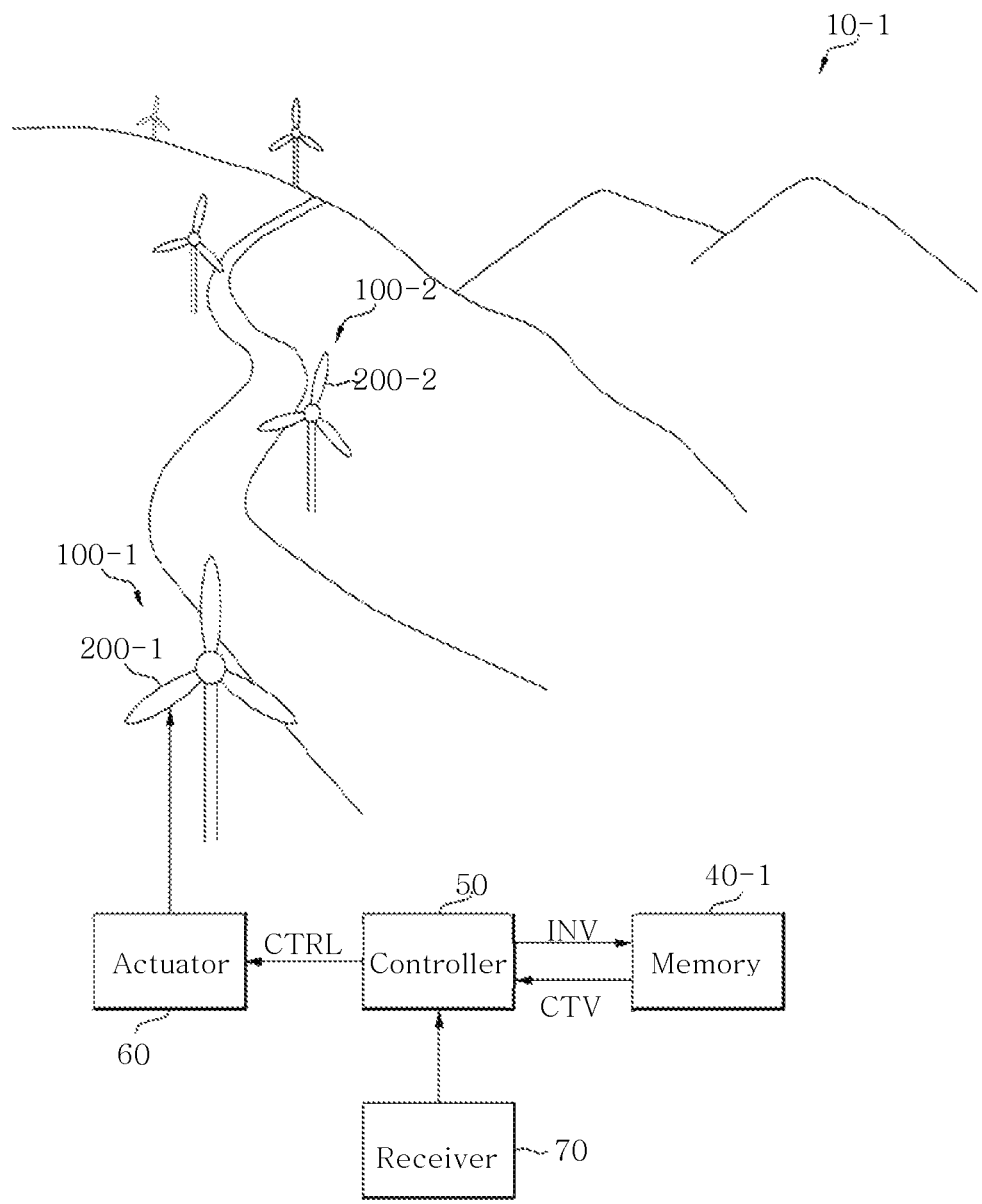
Figure 13:
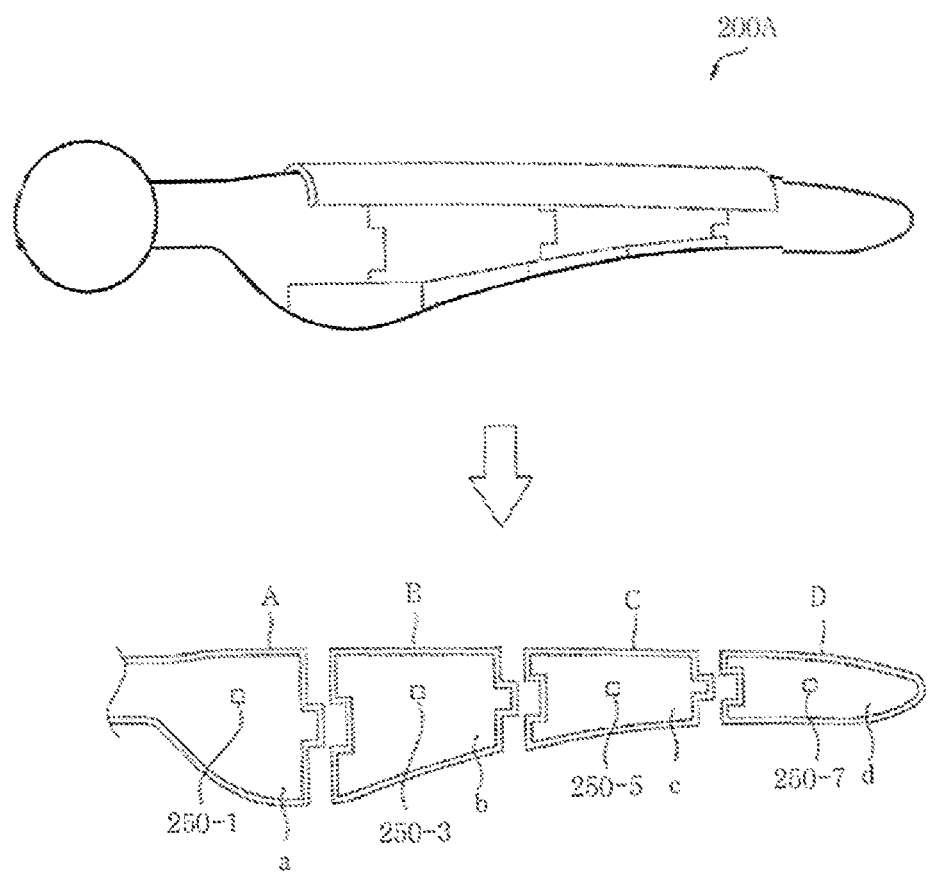

FIG. 13 shows the structure of the turbine shown in FIG. 1, 2, 9, 10, or 12.

Figure 14:
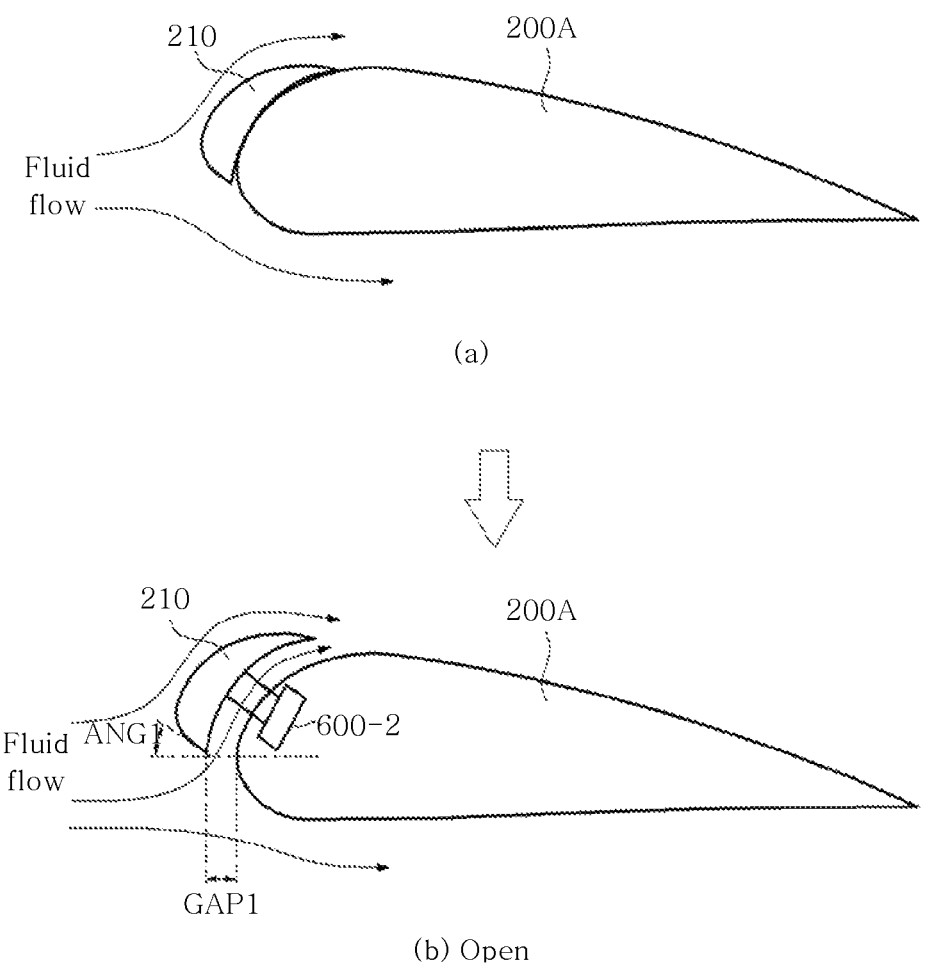

FIG. 14 illustrates an embodiment in which a three-dimensional shape of the turbine is modified by controlling a leading edge included in the turbine illustrated in FIG. 1, 2, 9, 10, or 12.

Figure 15:
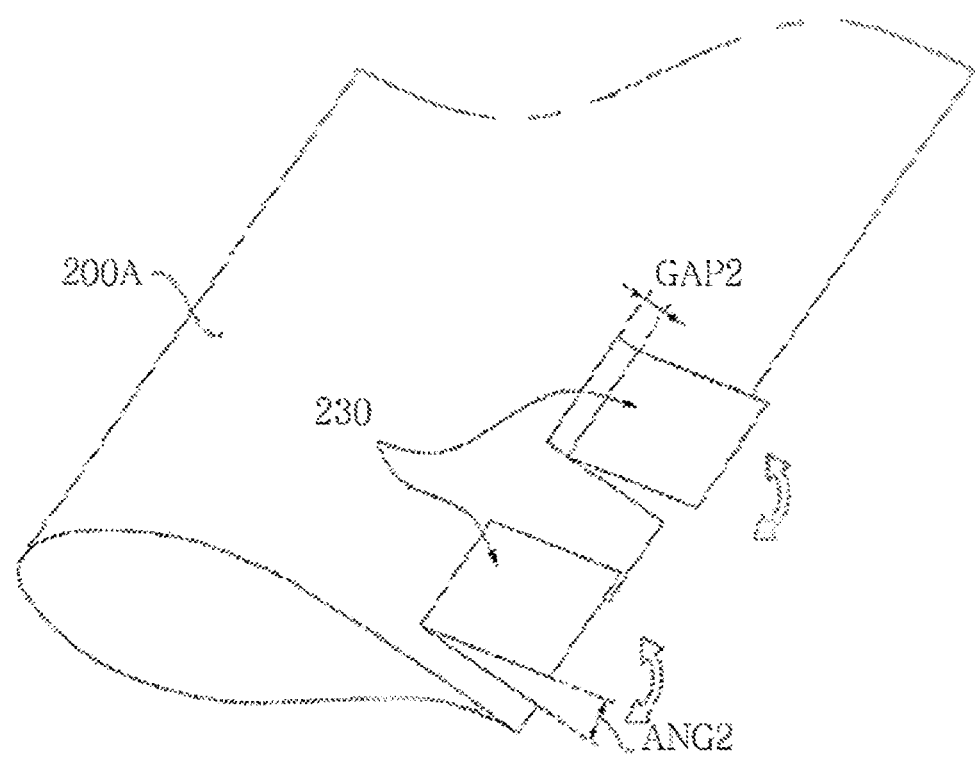

FIG. 15 illustrates an embodiment of modifying a three-dimensional shape of the turbine by controlling a trailing edge included in the turbine illustrated in FIG. 1, 2, 9, 10, or 12.

Figure 16:
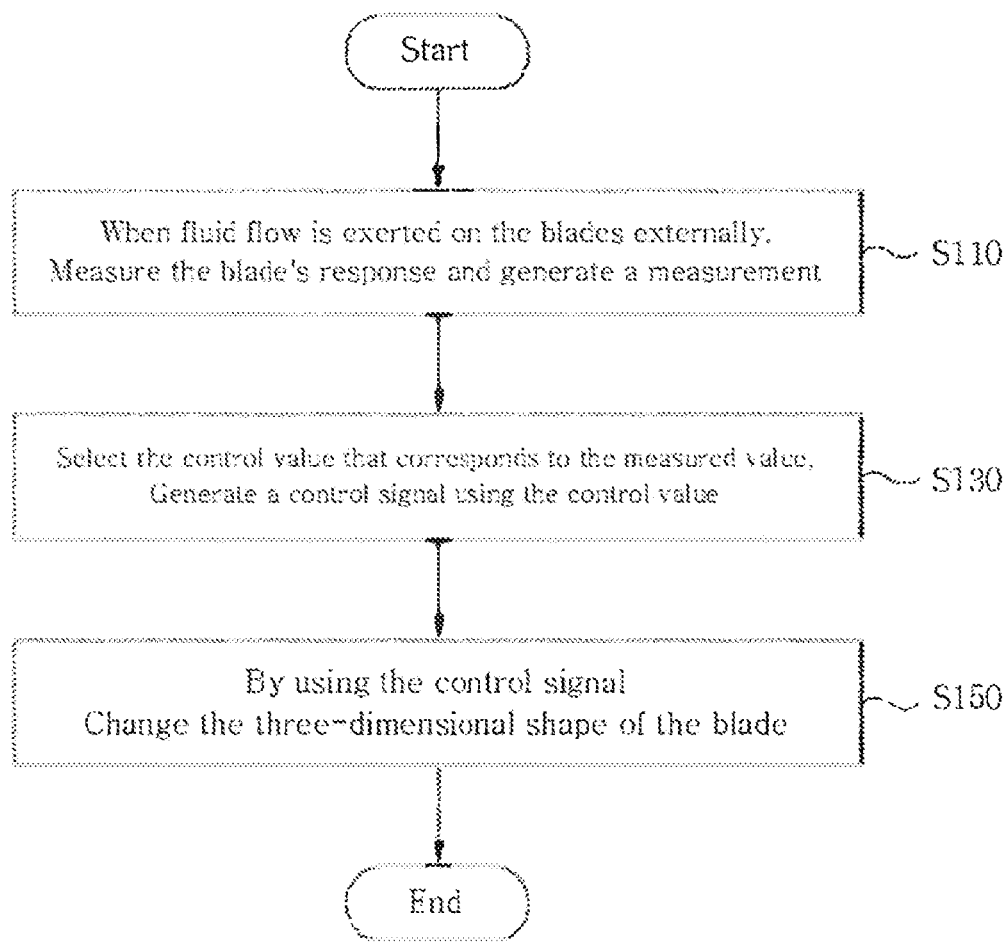

FIG. 16 is a flow chart illustrating the operation of the energy conversion device shown in FIG. 1, 2, or 9.

Figure 17:
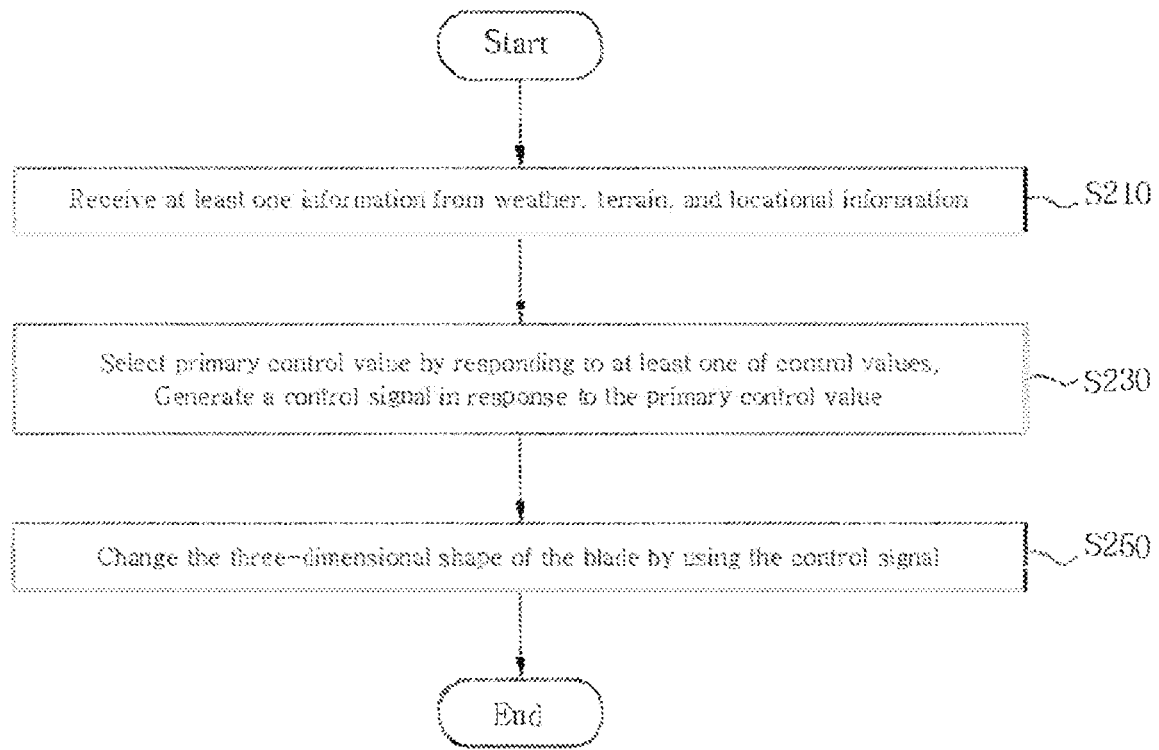

FIG. 17 is a flow chart illustrating the operation of the energy conversion system shown in FIG. 10 or 12.

THE SHAPE FOR EXECUTING THE INVENTION

FIG. 1 is a block diagram of an energy conversion device according to embodiments of the present invention. Referring to FIG. 1, the energy conversion device 100 includes a turbine 200, at least one measurement device 300, a memory 400, a controller 500, at least one actuator 600, and a receiver 700. It may include.

For example, the energy conversion device 100 may be a fluid flow, a liquid flow, a fluid flow, or a substance (e.g., gas, particles, liquid, Or a device capable of converting energy (e.g., mechanical energy) obtained from the flow of a solid body (solid body) into electric power (e.g., electrical energy). In the present specification, the fluid flow may be broadly interpreted as a concept including a liquid flow, a fluid flow, or a material flow.

The fluid flow may refer to the movement of a fluid in motion (e.g., including gas, particles, liquids, plasmas, and/or solid materials).

When the fluid flow is wind, tide, ocean current or sea current, deep water, river water flow, wave, or wind wave The energy conversion apparatus 100 according to the embodiments of the present invention may be a generator using wind energy or a generator using sea energy, but is not limited thereto. For example, the energy conversion device 100 may be a wind generator, tidal generator, or wave generator, but is not limited thereto. In addition, the energy conversion device 100 and its operation method to be described herein may be applied to a generator using geothermal energy. In addition, the technical idea of the present invention to control the three-dimensional shape of the turbine (or blade) can be applied to a generator for generating electrical energy using the turbines (or blades).

The wind generator may include an onshore type wind generator and an offshore type wind generator. The wind generator may include, but is not limited to, a floating offshore wind generator and a semi-submersible floating wind generator.

Wind power means converting wind (or wind) into power using a wind turbine, tidal power means generating power using the difference between the high and low tide of the sea, Wave power refers to the transfer of energy by sea wave or the production of power using the energy.

The turbine 200 may mean a rotary mechanical device that extracts energy from a fluid flow. The turbine 200 may refer to a structure (or device) capable of converting energy obtained from the fluid flow into electric power in response to an external force applied to the turbine 200 by the fluid flow.

According to embodiments, a turbine may be a blade, a turbine blade, a rotor blade, a wind turbine rotor blade, a tidal turbine blade, or it may mean a wind wave turbine blade. The energy conversion device 100 may include a plurality of turbines (or a plurality of blades). For example, a turbine (or blade) may broadly mean a vertical-axis wind turbine (VAWT) blade or a horizontal axis wind turbine (HAWT) blade.

The measuring device 300 measures (e.g., directly or indirectly measures) the response of the turbine (or blade) 200 when the fluid flow is exerted on the turbine (or blade; 200) externally. Measured values (or response values) corresponding to the results can be generated.

The reaction or the measured value may be determined by the position of the turbine 200 (or the angle of rotation to be described with reference to FIG. 4), the restoring force of the turbine 200, the elastic force of the turbine 200, the turbine (Aeroelasticity of 200, fatigue load of turbine 200, vibration of turbine 200, stress of turbine 200, gravity of turbine 200, Buoyancy of the turbine 200, rotational speed of the turbine 200, revolutions per minute (RPM) of the turbine 200, pitch angle of the turbine 200, turbine 200 Strain or strain rate, the acceleration of the turbine 200, the amount of ultraviolet rays of the turbine 200, the insolation of the turbine 200, the speed (or density) of the fluid flow, the turbine 200), And the humidity of the turbine 200.

The measuring device 300 may mean a device (or sensor) capable of measuring the response of the turbine 200 to a fluid flow or external force, or a device (or sensor) capable of generating the measured value. The measuring device 300 may collectively represent a plurality of measuring devices or a plurality of sensors. For example, when the measuring device includes a first measuring device and a second measuring device, the first measuring device can measure the restoring force of the turbine 200, and the second measuring device can measure the position (or rotational angle) of the turbine.) Can be measured, but is not limited thereto.

The measuring device 300 includes an electricity meter, a voltmeter, an ammeter, a direction sensor, an inertial sensor, a strain sensor, an acceleration sensor, and a gravitational acceleration sensor, Lidar, solarimeter, UV radiometer, barometer, temperature sensor, humidity sensor, pressure sensor, acceleration sensor, image sensor, optical camera, high speed camera, sound wave sensor, ultrasonic sensor (ultrasonic sensor), acoustic detector, Raman-based distributed temperature sensor, water flow sensor, water pressure sensor, wave meter However, it is not limited thereto.

For example, the measuring device 300 may measure the pitch angle of the turbine 200 using an orientation sensor or an inertial sensor, measure a strain using a strain sensor, and measure acceleration using an acceleration sensor. The time information and the space information of the turbine 200 may be measured by using a Lidar and an acoustic detector.

For example, each of the strain sensor and the acceleration sensor may be located at the center of a rotor connected to the turbine 200, and may be disposed at regular intervals inside or on the surface of the turbine 200. For example, the UV photometer, solar meter, temperature sensor, and humidity sensor can be located in the center of the hub of the rotor.

The at least one measuring device 300 may measure the response of the turbine 200 to the external force, and generate at least one measured value according to the measurement result. The measured value may be measured in various ways, such as wind direction, wind speed, stress, load, displacement, and accumulated fatigue life as described above. Cumulative amount of ultraviolet light, residual life time ratio, and/or power production, but are not limited thereto.

For example, the displacement means the degree to which the turbine 200 is bent by fluid flow, and the load means a force transmitted perpendicular to the tower 120 shown in FIG. 2, and the cumulative fatigue life is The number of times the load is repeated (or the time under which the load is received) until the energy conversion device 100 that is repeatedly subjected to the load is destroyed, and the power production amount (or power generation amount) may represent the amount of power generation of the energy conversion device 100.

The measuring apparatus 300 may measure the wind speed and wind speed applied to the turbine 200 by measuring the revolutions per minute of the turbine 200, and measure the strain and acceleration of the turbine 200 to displace the turbine 200. The amount of ultraviolet rays applied to the turbine 200 and the solar radiation system may be measured to measure the cumulative amount of ultraviolet rays of the turban 200, and the temperature and humidity of the turbine 200 may be measured to determine the turbine 200. The stress and the load may be measured, and the cumulative fatigue life of the turbine 200 may be measured using the stress and the load, but is not limited thereto. Here, the measurement may mean a calculation.

Wind direction and wind speed can be measured using a wind vane/anemometer installed in the nacelle (140 of FIG. 2), the receiver 700 may receive weather information including information on the wind direction and wind speed from a system that provides satellite or weather information.

Since the turbine 200 made of a composite material is weak to ultraviolet rays, if the cumulative amount of ultraviolet rays is large, the life of the turbine 200 is quickly decreased, and if the cumulative fatigue of the turbine 200 is increased, the turbine 200 is weakened, and Displacement may increase. Therefore, the controller 500 may calculate the remaining life of the turbine 200 by using the displacement, the cumulative amount of ultraviolet rays, and the cumulative fatigue life. According to embodiments, the measuring apparatus 300 may measure the wind direction and wind speed applied to the turbine 200 by using a wind vane and an anemometer installed in the nacelle (140 of FIG. 2).

The memory 400 may store control values capable of deforming the three-dimensional shape of the turbine 200. Although FIG. 1 illustrates that the memory 400 is disposed outside the controller 500, the memory 400 may be replaced with a cache memory or a data cache located inside the controller 500. The controller 500 accesses the memory 400 disposed externally or internally to obtain at least one control value CTV corresponding to the at least one measured value MSR measured from the at least one measuring device 300. The acquisition may be performed by a read operation or a pre-fetch operation.

For example, assume that the measuring device 300 includes a first measuring device and a second measuring device. The first measuring device includes a restoring force of the turbine 200, an elastic force of the turbine 200, an aeroelasticity of the turbine 200, a fatigue load of the turbine 200, a vibration of the turbine 200, a deformation force of the turbine 200, Gravity of turbine 200, buoyancy of turbine 200, rotational speed of turbine 200, pitch angle of turbine 200, strain of turbine 200, acceleration of turbine 200, ultraviolet ray of turbine 200 Amount, the solar radiation of the turbine 200, the speed (or density) of the fluid flow applied to the turbine 200, the temperature of the turbine 200, and the humidity of the turbine 200 is measured and according to the measurement result, Measured values can be generated.

As shown in FIG. 4, the second measurement device generates a second measurement value BP1 or BP2 according to a measurement result of measuring the position (or rotation angle) of the rotating turbine 200. For example, the measured value BP1 measured at the first position has little influence on the power production of the other energy conversion device, and the measured value BP2 measured at the second position has higher influence on the power production of the other energy conversion device.

The controller 500 reads (or selects) any one control value (e.g., the first control value) among control values stored in the memory 400 in response to the first measurement value output from the first measuring device. The control signal CTRL may be generated using the first control value CTV.

The actuator 600 responds to the control signal CTRL output from the controller 500 to the pitch angle of the turbine 200, the leading edge attached to the turbine 200, and/or or the turbine 200. Attached trailing edges can be controlled. An embodiment of controlling the leading edge will be described with reference to FIG. 14, and an embodiment of controlling the trailing edge will be described with reference to FIG. 15. That is, the three-dimensional shape of the turbine 200 may be defined by pitch angle, leading edge, and/or trailing edge, but is not limited thereto.

The controller 500 may control the other control value among control values stored in the memory 400 in response to the first measurement value output from the first measurement device and the second measurement value output from the second measurement device. For example, the second control value) may be read (or selected) and the control signal CTRL may be generated using the second control value CTV. At this time, the actuator 600 is a pitch angle of the turbine 200, a leading edge attached to the turbine 200, and/or attached to the turbine 200 in response to the control signal CTRL output from the controller 500 The trailing edge can be controlled.

The receiver 700 may include weather information around the energy conversion device 100, terrain information of a location where the energy conversion device 100 is installed, and/or location information about a location where the energy conversion device 100 and other energy conversion devices are installed. And receive the weather information, the terrain information, and/or the location information to the controller 500. The controller 500 may generate a control value corresponding to the weather information, the terrain information, and/or the location information, and store the control value in the memory 400.

That is, each of the control values stored in the memory 400 by the controller 500 has a different value according to at least one of the weather information, the terrain information, and the location information. According to embodiments, the controller 500 may mean a processor, a microprocessor, a CPU, or a computing device.

FIG. 2 is a diagram illustrating an embodiment of the energy conversion device illustrated in FIG. 1. A wind power generator 100A according to an embodiment of the energy conversion device 100 of FIG. 1 includes a foundation 110, a tower 120, a rotor 130, and a nacelle 140. A plurality of blades 200A, at least one measuring device 300A, memory 400A, controller 500A, and at least one actuator 600-1, 600-2, and 600-3. It may include.

Each blade 200A corresponds to the turbine 200 of FIG. 1, at least one measuring device 300A corresponds to at least one measuring device 300 of FIG. 1, and memory 400A corresponds to the memory of FIG. 1. 400, the controller 500A corresponds to the controller 500 of FIG. 1, and each actuator 600-1, 600-2, and 600-3 corresponds to the actuator 600 of FIG. 1.

An actuator is used herein to describe a system (e.g., an energy converter, a wind generator, tidal generator, or wave generator, etc.) or a mechanical device used to move or control a component included in the system. It means the component of (component of machine). For example, the actuator may include, but is not limited to, an electric actuator, a hydraulic actuator, and a pneumatic actuator.

Foundation 110 is installed on the ocean, seabed, or land. The tower 120 supports the rotor 130 and the nacelle 130 and serves to elevate the rotor 130 and the nacelle 130 to obtain a large output at a strong wind speed.

The rotor 130 converts wind energy into mechanical energy, and a rotor hub attached to the front end of the rotor 130 serves to support the plurality of blades 200A. Each blade (or rotor blade) 200A serves to rotate the rotor 130 by capturing energy possessed by the wind. Nacelle 140 is composed of a device for converting the mechanical energy generated by the rotor 130 into electrical energy.

Each blade 200A may comprise at least one leading edge 210, at least one trailing edge, and at least one measuring device 300A. In FIG. 2, an embodiment in which the measuring device 300A is disposed on the surface of each blade 200A is illustrated, but according to the exemplary embodiments, the measuring device 300A may be present inside each blade 200A.

The measuring device 300A, when fluid or fluid flow is exerted on the blade 200A with an external force, reacts the blade 200A with the external force (e.g., a direct or indirect reaction). It can measure and generate measurement value (MSR) according to the measurement result.

The memory 400A may store each control value corresponding to each measured value MSR. Each control value may be stored in the form of a lookup table 410, and various forms of the LUT 410 stored in the memory 400A will be described in detail with reference to FIGS. 3 to 8. The LUT 410 may store control values CTV corresponding to the measured values.

The controller 500A reads the control value CTV of any one (or at least one) among the control values stored in the memory 400A in response to the measured value MSR output from the measuring apparatus 300A, and controls the control value (The control signal CTRL may be generated using the CTV.

The actuator 600-1, 600-2, or 600-3 may deform the three-dimensional shape of the blade 200A in response to the control signal CTRL1, CTRL2, or CTRL3 output from the controller 500A. The first actuator 600-1 capable of deforming the three-dimensional shape of the blade 200A adjusts the pitch angle of the blade 200A in response to the first control signal CTRL1 to adjust the three-dimensional shape of the blade 200A.

FIGS. 2 and 14, the blade 200A includes at least one leading edge 210. The second actuator 600-2 may open or close the leading edge 210 in response to the second control signal CTRL2, a gap GAP1 between the leading edge 210 and the blade 200A, and the leading edge 210. And at least one of the angles ANG1 between the blades 200A. According to at least one of the gap GAP1 and the angle ANG1, the speed of the fluid flow applied to the blade 200A, the density of the fluid, and/or the direction of the fluid may be changed.

2 and 15, blade 200A includes at least one trailing edge 230. The third actuator 600-3 may open or close the trailing edge 230 in response to the third control signal CTRL3, a gap GAP2 between the trailing edge 230 and the blade 200A, and the trailing edge. At least one of the angle ANG2 between the 230 and the blades 200A may be adjusted. Depending on at least one of the gap GAP2 and the angle ANG2, the speed of the fluid flow through the blade 200A, the density of the fluid, and/or the direction of the fluid may be changed.

The control of the leading edge 210 and/or the control of the trailing edge 230 may be determined according to a numerical value (e.g., a measured value) of the blade 200A's response to an external force applied to the blade 200A.

FIGS. 3 to 8 illustrate an embodiment of control objects and control values stored in the memory illustrated in FIG. 1 or 2. Referring to FIG. 3, the measurement object and the measured value measured by the measuring device 300 or 300A may include wind direction or wind speed, stress or load, displacement, cumulative fatigue life, cumulative ultraviolet light amount, residual life, and/or It may be a power output, but is not limited thereto. The control object and the control value corresponding to the measurement object and the measured value may be stored in the memory 400 or 400A. According to embodiments, the control object and the control value corresponding to the measurement object and the measurement value may be stored in the memory 400 or 400A in the form of a first lookup table (LUT1).

For example, when the deformation force of the turbine 200 or the blade 200A is the response or measured value MSR, the controller 500 or 500A may control the plurality of control values PA1, LE1, TE1, A first pitch angle PA1 corresponding to the first measured value MSR=M1, a first leading edge control value LE1, and/or a first trailing edge control value TE1 among PA2, LE2, and TE2)) Can be read or selected as the control value CTV. That is, the controller 500 or 500A may retrieve the control values PA1, LE1, and/or TE1 corresponding to the first measurement value MSR=M1 from the memory 400 or 400A.

In an embodiment, when the cumulative power output PO2 of the wind generator 200A is the measured value MSR, the controller 500A may control the plurality of control values PA1, LE1, TE1, PA2, and LE2 stored in the memory 400A. Control the second pitch angle PA2, the second leading edge control value LE2, and/or the second trailing edge control value TE2 corresponding to the second measured value MSR=PO2. It can be read or selected as the value CTV. That is, the controller 500A may retrieve the control values PA2, LE2, and/or TE2 corresponding to the second measurement value MSR=PO2 from the memory 400A.

The controller 500 or 500A determines the type (or measurement object) of the measuring device 300 or 300A or the sensor, and among the control objects (e.g., pitch angle, leading edge, and trailing edge) according to the result of the determination. It is possible to determine how many control object (s) to control.

As the wind speed increases, the amount of power generated by the wind generator 100A increases, but the load applied to the wind generator 100A increases, so that the first lookup table LUT1 considers the wind speed and the load to generate the maximum amount of power generated by the wind generator 100A. It may include control values for controlling. For example, the wind direction and the wind speed are the first value (M1), the stress and the load are the second value (L1), the displacement is the third value (D1), the cumulative fatigue life is the fourth value (F1), and the cumulative amount of ultraviolet light When the fifth value (U1), the remaining life is the sixth value (R1), and the power output is the seventh value (PO1), the controller 500A is the first pitch angle (PA1), the first leading edge control value LE1 and/or the first trailing edge control value TE1 may be output as the control value CTV.

That is, the controller 500 or 500A reads, selects or searches one control value or a plurality of control values from the memory 400 or 400A by using the measured value output from one measuring device or the measured values output from the plurality of measuring devices.

Referring to FIG. 4, the measured object and the measured value measured by the first measuring device include the restoring force, elastic force, aeroelasticity, fatigue load, vibration, strain force, gravity, buoyancy force, rotational speed, and pitch angle of the blade 200 or 200A. Strain, acceleration, amount of ultraviolet light, insolation, wind speed, temperature, and/or humidity, and the measurement object and the measured value measured by the second measuring device are assumed to be the positions of the blades 200 or 200A, but are not limited thereto. As described above, although one measuring device 300 or 300A is shown in FIGS. 1 and 2, each measuring device 300 or 300A collectively comprises one or more measuring devices (or sensors). Represented by Thus, each measuring device 300 or 300A can be understood to include a first measuring device and a second measuring device.

The control object and the control value corresponding to the measurement object and the measured value may be stored in the memory 400 or 400A. According to embodiments, the control object and the control value corresponding to the measurement object and the measured value may be stored in the memory 400 or 400A in the form of a second lookup table LUT2. For example, when the deformation force of the blade 200 or 200A is measured by the primary measuring device and the position of the blade 200 or 200A is measured by the secondary measuring device, the controller 500 or 500A may read, select or search the primary pitch angle PA1-1, the primary leading edge control value LE1-1, and/or the primary trailing edge control value TE1-1 corresponding to measured values M1 and BP1 among the multitude of control values PA1-1, PA1-2, LE1-1, LE1-2, TE1-1, and Te1-20 stored in memory 400 or 400A in response to measured values (M1 and BP1) as control values (CTV).

For example, when the strain of the blades 200 or 200A is measured by the first measuring device and the position of the blades 200 or 200A is measured by the second measuring device, the controller 500 or 500A may read, select or search the primary pitch angle PA1-2, the secondary leading edge control value LE1-2, and/or the secondary trailing edge control value TE1-1 corresponding to measured values M1 and BP2 among the multitude of control values PA1-1, PA1-2, LE1-1, LE1-2, TE1-1, and Te1-20 stored in memory 400 or 400A in response to measured values M1 and BP2 as control values (CTV).

The controller 500 or 500A may generate at least one control signal CTRL1, CTRL2, and/or CTRL3 in response to the retrieved control values CTV. Accordingly, the at least one actuator 600-1, 600-2, and/or 600-3 may select at least one of the pitch angle, the leading edge 210, and the trailing edge 230 of the blade 200 or 200A. Can be controlled. As a result, the three-dimensional shape of the blade 200 or 200A is changed.

Referring to FIG. 5, the measured object and the measured value measured by the first measuring device include the restoring force, elastic force, aeroelasticity, fatigue load, vibration, strain force, gravity, buoyancy force, rotational speed, and pitch angle of the blade 200 or 200A. Strain, acceleration, amount of ultraviolet light, insolation, wind speed, temperature, and/or humidity, the measurement object and the measured value measured by the second measuring device are the positions of the blades 200 or 200A, and the energy conversion device 100 or the cumulative power output of 100A) is assumed to be a reference value, but is not limited thereto. It is assumed that the power output is measured by the third measuring device, and the accumulated power output is accumulated in the memory 400 or 400A by the controller 500 or 500A.

As described above, although one measuring device 300 or 300A is shown in FIGS. 1 and 2, each measuring device 300 or 300A collectively represents one or more measuring devices. Thus, each measuring device 300 or 300A may be understood to include a first measuring device, a second measuring device, and a third measuring device.

The control object and the control value corresponding to the measurement object, the measured value, and the reference value may be stored in the memory 400 or 400A. According to embodiments, the control object and the control value corresponding to the measurement object, the measurement value, and the reference value may be stored in the memory 400 or 400A in the form of a third lookup table LUT3.

For example, the deformation force of the blades 200 or 200A is measured by the first measuring device and the position of the blades 200 or 200A is measured by the second measuring device, and the cumulative power production amount is set to the first value PO1-1. The controller 500 or 500A has a plurality of control values PA1-3 to PA1-6 and LE1 stored in the memory 400 or 400A using the measured values M2 and BP1 and the reference value PO1-1. The first pitch angle PA1-2, the first leading edge control value LE1-3, and/or the first trailing edge control value (-3 to LE1-6 and TE1-3 to TE1-6). TE1-3) may be read, selected, or retrieved as control values CTV.

The controller 500 or 500A may generate at least one control signal CTRL1, CTRL2, and/or CTRL3 in response to the retrieved control values CTV. Accordingly, the at least one actuator 600-1, 600-2, and/or 600-3 may control at least one of the pitch angle of the blade 200 or 200A, the leading edge 210, and the trailing edge 230.

Referring to FIG. 6, the measurement target and the measured value measured by the first measuring device include the restoring force, elastic force, aeroelasticity, fatigue load, vibration, strain force, gravity, buoyancy force, rotational speed, and pitch angle of the blade 200 or 200A. Strain, acceleration, amount of ultraviolet light, insolation, wind speed, temperature, and/or humidity, the measurement object and the measured value measured by the second measuring device are the positions of the blades 200 or 200A, the topographic information, the weather information, And at least one of location information is assumed to be a reference value, but is not limited thereto. The controller 500 or 500A receives at least one of the terrain information, the weather information, and the location information through the receiver 700, and stores the received information in the memory 400 or 400A.

The control object and the control value corresponding to the measurement object, the measured value, and the reference value may be stored in the memory 400 or 400A. According to embodiments, the control object and the control value corresponding to the measurement object, the measurement value, and the reference value may be stored in the memory 400 or 400A in the form of a fourth lookup table LUT4.

The terrain information includes information about a terrain (topograph or geographical features) in which the energy conversion device 100 or 100A is installed, and the weather information includes weather information of a place where the energy conversion device 100 or 100A is installed. The location information includes information on the location where the energy conversion device 100 or 100A is installed and/or information on the location where the other energy conversion device is installed.

For example, the elastic force of the blades 200 or 200A is measured by the first measuring device, and the position of the blades 200 or 200A is measured by the second measuring device, and at least one of the terrain information, the weather information, and the position information is determined. When having the second value ECP2, the controller 500 or 500A uses the measured values M3 and BP2 and the reference value ECP2 to control the plurality of control values PA1-7 stored in the memory 400 or 400A. A fourth pitch angle (PA1-10), a fourth leading edge control value (LE1-10), and/or a fourth of ¯PA1-10, LE1-7 to LE1-10, and TE1-7 to TE1-10) The trailing edge control value TE1-10 may be read, selected, or retrieved as the control values CTV.

The controller 500 or 500A may generate at least one control signal CTRL1, CTRL2, and/or CTRL3 in response to the retrieved control values CTV. Accordingly, the at least one actuator 600-1, 600-2, and/or 600-3 may select at least one of the pitch angle, the leading edge 210, and the trailing edge 230 of the blade 200 or 200A. Can be controlled.

Referring to FIG. 7, the measured object and the measured value measured by the first measuring device include the restoring force, elastic force, aeroelasticity, fatigue load, vibration, strain force, gravity, buoyancy force, rotational speed, and pitch angle of the blade 200 or 200A. Strain, acceleration, amount of ultraviolet light, insolation, wind speed, temperature, and/or humidity, the measurement object and the measured value measured by the second measuring device are the state of the part, and at least among the terrain information, weather information, and position information. One assumes a reference value, but is not limited thereto. The component may include at least one blade 200 or 200A, at least one component included in the rotor 130, at least one component included in the nacelle 140, and/or at least included in the tower 120. It may mean one component, but is not limited thereto.

The control object and the control value corresponding to the measurement object, the measured value, the location information, the terrain information, the weather information, and the part state may be stored in the memory 400 or 400A. According to embodiments, the control object and the control value corresponding to the measurement object, the measured value, the location information, the terrain information, the weather information, and the part state may be stored in the memory 400 or 400A in the form of a fifth lookup table LUT5.

For example, when the vibration of the blade 200 or 200A is measured by the first measuring device and the state of the part is measured by the second measuring device, the controller 500 or 500A refers to the measured values MV1 and S1. A first pitch angle PA3, a first reading among the plurality of control values PA3, PA4, LE3, LE4, TE3, and TE4 stored in the memory 400 or 400A using the values P1, T1, and W1. The edge control value LE3 and/or the first trailing edge control value TE3 may be read, selected, or retrieved as the control values CTV.

The controller 500 or 500A may generate at least one control signal CTRL1, CTRL2, and/or CTRL3 in response to the retrieved control values CTV. Accordingly, the at least one actuator 600-1, 600-2, and/or 600-3 may control at least one of following: the pitch angle of the blade 200 or 200A, the leading edge 210, and the trailing edge 230.

Referring to FIG. 8, the control object and the control value corresponding to the measurement object, the measured value, the location information, the terrain information, and the weather information may be stored in the memory 400 or 400A. According to embodiments, the control object and the control value corresponding to the measurement object and the measured value, location information, terrain information, and weather information may be stored in the memory 400 or 400A in the form of a sixth lookup table LUT6.

For example, when the rotational speed per minute of the blades 200 or 200A is measured by the first measuring device and the position of the blades 200 or 200A is measured by the second measuring device, the controller 500 or 500A determines the measured values. A plurality of control values PA3-1 to PA3-16 and LE3-1 to stored in the memory 400 or 400A using the MV3 and BP2 and the reference values T1-4, W1-7, and P1-2. 14th pitch angle (PA3-14), 14th leading edge control value (LE3-14), and/or 14th trailing edge control value (TE3-14) among LE3-16 and TE3-1-TE3-16) Can be read, selected, or retrieved as control values CTV.

The controller 500 or 500A may generate at least one control signal CTRL1, CTRL2, and/or CTRL3 in response to the retrieved control values CTV. Accordingly, the at least one actuator 600-1, 600-2, and/or 600-3 may control at least one of following: the pitch angle of the blade 200 or 200A, the leading edge 210, and the trailing edge 230.

3 to 8, the measurement object, the measurement value, the reference value, and the control object and the control value stored in each lookup table (LUT1 to LUT6, LUT collectively) have been described, but the controller 500 or 500A is described. The values not stored in the lookup tables LUT1 to LUT6 may interpolate adjacent control values to generate control signals CTRL1, CTRL2, and/or CTRL3, collectively CTRL. For example, referring to FIGS. 2 and 3, when the measured value MSR is present between the measured values M1 and M2, the controller 500 or 500A causes the pitch angles corresponding to the measured values M1 and M2. The first control signal CTRL1 may be generated by searching for PA1 and PA2 and interpolating the pitch angles PA1 and PA2.

Referring back to FIG. 2, the first actuator 600-1 may adjust the pitch angle of the blade 200A based on the first control signal CTRL1.

The pitch angle may increase or decrease the lifting force generated in the blade 200A. For example, as the wind speed increases, the lift force generated in the blade 200A increases, so that the amount of power generated by the wind generator 100A increases, but the load applied to the wind generator 100A also increases, thereby reducing the load and maintaining the amount of power generated constant. To do this, the pitch angle may be adjusted in a direction to reduce the area of the blade 200A to be winded.

FIGS. 2 and 14, the second actuator 600-2 opens and shuts the leading edge 210 in response to the second control signal CTRL2, the leading edge 210 and the blade 200A. The gap GAP1) or the angle ANG1 between the leading edge 210 and the blade 200A may be adjusted to deform the three-dimensional shape of the blade 200A.

When the wind generator 100A is located in an area where there is little wind, when the leading edge 210 is opened, the density of fluid flow between the leading edge 210 and the blade 200A is increased by the venturi effect. And lift force (lift force) increases because the pressure received by the blade (200A) increases. Therefore, since the rotational speed of the blade 200A increases, the leading edge 210 may perform a function of collecting a lot of wind around the wind generator 100A. In addition, as the leading edge 210 is opened more, the load of the wind generator 100A or the blade 200A is reduced. Therefore, unlike when the pitch angle is adjusted, if the lift force is increased, the load of the wind generator 100A or the blade 200A decreases.

FIGS. 2 and 15, the third actuator 600-3 may open or close the trailing edge 230 based on the third control signal CTRL3, and may open or close the trailing edge 230 between the blade 200A and the trailing edge 230. The three-dimensional shape of the blade 200A may be modified by adjusting the gap GAP2 or the angle ANG2 between the trailing edge 230 and the blade 200A.

The higher the speed of the fluid, the more turbulence generated in the blade 200A. The trailing edge 230 may reduce turbulence and direct the direction of the propeller wash, wake stream, or slip stream to another wind generator. Therefore, the energy conversion efficiency of the other wind generator is effective to increase.

Although four trailing edges 230 are shown in FIG. 2, the technical idea of the present invention is not limited to the arrangement and number of trailing edges 230. In addition, although one leading edge 210 is illustrated in FIG. 2, the technical idea of the present invention is not limited to the arrangement and number of the leading edges 210.

FIG. 13 shows the structure of the turbine shown in FIG. 1, 2, 9, 10, or 12. As shown in FIG. 13, blade 200A includes a plurality of attachable and detachable parts (A, B, C, and D), each of which (A, B, C, and D) may include closed spaces (a, b, c, and d) for storing gas lighter than air or a material having a density less than that of the fluid (air or water) acting externally on the blade 200A.

Therefore, as each enclosed space (a, b, c, and d) is implemented in the blade (200A), the weight of the blade (200A) is reduced, so that the load applied to the wind generator (100A) is reduced. Each of the enclosed spaces a, b, c, and d may include injection ports 250-1, 250-3, 250-5, and 250-7 for injecting the gas or the substance.

FIG. 9 is a diagram illustrating another embodiment of the energy conversion device illustrated in FIG. 1. 9, a wind generator 100B according to another embodiment of the energy conversion device 100 of FIG. 1 includes a blade 200A, a measuring device 300A, a memory 400B, a controller 500B, and an actuator. And the like 600-1, 600-2, and 600-3.

The structure and function of the blade 200A of FIG. 9 is the same as or similar to the structure and function of the blade 200A of FIG. 2, and the structure and function of the measuring device 300A of FIG. 9 is the measuring device 300A of FIG. 2. The structure and function of each of the actuators 600-1, 600-2, and 600-3 of FIG. 9 are similar to those of the actuators 600-1, 600-2, and 600-3 of FIG.) Is similar in structure and function. The memory 400B of FIG. 9 corresponds to the memory 400A of FIG. 2, and the controller 500B of FIG. 9 corresponds to the controller 500A of FIG. 2.

The memory 400B may store the fluid dynamics simulation program 430. The controller 500B may read the hydrodynamic simulation program 430 from the memory 400B and execute the read hydrodynamic simulation program 430. The controller 500B may generate at least one control signal CTRL1, CTRL2, or CTRL3 corresponding to the measured value MSR output from the measuring device 300A using the fluid dynamics simulation program 430.

The energy conversion device 100B for converting the mechanical energy obtained from the fluid flow into electrical energy measures the blade 200A and the response of the blade when the fluid flow is applied to the blade 200A with an external force, At least one control signal CTRL1, CTRL2, and/or CTRL3 using one or more measurement values corresponding to the result using the measurement device 300A and one or more measurement values output from the measurement device 300A. The controller 500B for generating a and at least one actuator for modifying the three-dimensional shape of the blade (200A) in response to the at least one control signal (CTRL1, CTRL2, and/or CTRL3) output from the controller (500B) 600-1, 600-2, and/or 600-3). Here, the fluid dynamics simulation program may mean firmware, software, a program, or a simulation program.

The memory 400B may store a fluid dynamics simulation program, such as a computational fluid dynamics (CFD) program, or finite element method (FEM) software. The controller 500B executes the CFD program 430 stored in the memory 400B, and causes the CFD program 430 to use at least one control signal (1) by using one or more measurement values output from the measuring device 300A. CTRL1, CTRL2, and/or CTRL3).

The memory 400B may further store any one of the lookup tables LUT1 to LUT6 described with reference to FIGS. 3 to 8 in addition to the fluid dynamics simulation program 430.

The controller 500B includes at least one of weather information around the energy conversion device 100B, topographic information of a place where the energy conversion device 100B is installed, and position information on a location where the energy conversion device 100B and another energy conversion device are installed. One can be received via the receiver 700. The fluid dynamics simulation program 430 may generate at least one control signal CTRL1, CTRL2, and/or CTRL3 using the at least one and one or more measured values output from the measuring device 300A. According to embodiments, the fluid dynamics simulation program 430 may use at least one of the lookup tables LUT1 to LUT6 stored in the memory 400B and one or more measurement values output from the measurement device 300A. Control signals CTRL1, CTRL2, and/or CTRL3 may be generated.

Each of the measurement devices included in the measurement device 300A may measure the position of one of the measurement objects described above with reference to FIG. 4 and the blade 200A, and generate measurement values corresponding to the measurement result. The controller 500B or the fluid dynamics simulation program 430 may generate at least one control signal CTRL1, CTRL2, and/or CTRL3 using the measured values output from the measuring devices.

Each actuator 600-1, 600-2, and 600-3 responds to each control signal CTRL1, CTRL2, and CTRL3 to control the pitch angle of the blade 200A, control of the leading edge 210, and trailing. By controlling the edge 230, the three-dimensional shape of the blade 200A may be modified.

FIG. 10 shows a conceptual diagram of an energy conversion system according to embodiments of the present invention. The energy conversion system 10 of FIG. 10 may be an energy harvesting system that includes a plurality of energy conversion devices (e.g., wind generators) 100-1 and 100-2. The energy conversion system 10 may be an embodiment of a wind farm, which may refer to a group of wind turbines (or wonder blades) used to produce electricity.

Referring to FIG. 10, the energy harvesting system or the energy conversion system 10 may include a first wind power generator 100-1, a second wind power generator 100-2, and a measuring device 20. The measuring device 20 refers to a device capable of measuring wind and wind speed.

The measurer 20 may measure wind power, generate wind power values WIND, and transmit the generated wind power values WIND to the controller 50. According to embodiments, weather information (or weather signal) output from the satellite or the lighthouse may be transmitted to the receiver 70.

Except that the measuring device 20 is installed instead of the measuring device 300A, the structure of each wind generator 100-1 and 100-2 is the same as that of the wind generator 100A or 100B shown in FIG. 2 or 9. In other words, each wind generator 100-1 and 100-2 includes a tower, a rotor, a nacelle, and a plurality of blades, each of the plurality of blades having at least one leading edge and/or at least one trailing edge.

Each actuator 600-1, 600-2, for controlling the pitch angle, each leading edge 210, and each trailing edge 230 of each blade of each wind generator 100-1 and 100-2, and 600-3, collectively 60, may be included in each wind generator 100-1 and 100-2.

The control center for controlling the operation of each wind generator 100-1 and 100-2 includes a memory 40, a controller 50, and a receiver 70.

The first wind power generator 100-1 includes the first blades 200-1 and the first actuators, each of the first actuators being the actuators 600-1, 600-2, and 600-3, respectively. Corresponding to the first actuators 600-1, 600-2, and 600-3 correspond to and collectively correspond to the control signals CTRL1, CTRL2, and CTRL3 output from the controller 50. The three-dimensional shape of each of the first blades 200-1 may be modified by controlling the pitch angle, the leading edge, and the trailing edge of each of the first blades 200-1 in response to each of the CTRL.

The second wind power generator 100-2 includes the second blades 200-2 and the second actuators, each of the second actuators being the actuators 600-1, 600-2, and 600-3, respectively. Corresponding to the second actuators 600-1, 600-2, and 600-3 correspond to and collectively correspond to the control signals CTRL1, CTRL2, and CTRL3 output from the controller 50. In response to each of the CTRLs, the three-dimensional shape of each of the second blades 200-2 may be modified by controlling the pitch angle, the leading edge, and the trailing edge of each of the second blades 200-2.

The memory 40 may store a control object and a control value corresponding to the input value to be described with reference to FIG. 11.

The controller 50 reads a first control value among control values stored in the memory 40 in response to the wind power value WIND output from the measuring device 20, and controls the control signal CTRL in response to the read first control value.) At least one of the first actuators may deform at least one three-dimensional shape of the first blades 200-1 in response to the control signal CTRL output from the controller 50.

Each of the control values stored in the memory includes weather information around each wind generator 100-1 and 100-2, topographic information of a place where each wind generator 100-1 and 100-2 is installed, and each wind generator 100-1 and 100-2 have different values according to at least one of the location information on the installed location.

The controller 50 may store the weather information, the terrain information, and/or the location information received through the receiver 70 in the memory 40.

One of the first actuators may modify the three-dimensional shape of each of the first blades 200-1 by adjusting the pitch angle of each of the first blades 200-1 in response to the control signal CTRL. Can be. The other of the first actuators may open or close a leading edge in response to a control signal CTRL, a gap between the leading edge and each of the first blades 200-1, and the leading edge and the first blade. The three-dimensional shape of each of the first blades 200-1 may be modified by adjusting at least one of the angles ANG1 between the fields 200-1.

Another one of the first actuators may open or close a trailing edge in response to a control signal CTRL, a gap between the trailing edge and each of the first blades 200-1, and the trailing edge. And three-dimensional shapes of each of the first blades 200-1 may be modified by adjusting at least one of angles between the first blades 200-1 and each of the first blades 200-1.

FIG. 11 illustrates an embodiment of control objects and control values stored in the memory illustrated in FIGS. 10. 10 and 11, the wind power value, the input value, and the control object and the control value may be stored in the memory 40. According to embodiments, the control target and the control value corresponding to the wind power value, location information, terrain information, and weather information may be stored in the memory 40 in the form of a seventh look-up table LUT7.

For example, when the wind power value WIND output from the measuring device 20 is the first wind power value WIND1, the controller 50 determines the measured value WIND1 and the input values T1-2, W1-4, and P1. Pitch angle PA3-8 among the plurality of control values PA3-1 to PA3-16, LE3-1 to LE3-16, and TE3-1 to te3-16 stored in the memory 40 by using a -2). The eighth leading edge control value LE3-8, and/or the eighth trailing edge control value TE3-8 may be read, selected, or retrieved as the control values CTV.

The controller 50 may generate at least one control signal CTRL1, CTRL2, and/or CTRL3, collectively CTRL, in response to the retrieved control values CTV. Therefore, the at least one first actuator may control at least one of the pitch angle, the leading edge, and the trailing edge of the first blade 200-1.

In addition, when the wind power value WIND output from the measuring device 20 is the first wind power value WIND1, the controller 50 determines the measured value WIND1 and the input values T1-1, W1-1, and P1. The first pitch angle PA3-1 among the plurality of control values PA3-1 to PA3-16, LE3-1 to LE3-16, and TE3-1 to TE3-16 stored in the memory 40 by using a -1). The first leading edge control value LE3-1, and/or the first trailing edge control value TE3-1 may be read, selected, or retrieved as the control values CTV.

The controller 50 may generate at least one control signal CTRL1, CTRL2, and/or CTRL3, collectively CTRL, in response to the retrieved control values CTV. Accordingly, the at least one first actuator may control at least one of the pitch angle, the leading edge, and the trailing edge of the first blade 200-1.

12 illustrates a conceptual diagram of an energy conversion system according to embodiments of the present invention. Except for the meter 20, the structure and operation of the energy conversion system 10-1 of FIG. 12 are the same as or similar to the structure and operation of the energy conversion system 10 of FIG. 10.

In addition, the control values stored in the memory 40-1 do not include the wind power value WIND measured from the meter 20.

The controller 50, through the receiver 70, weather information around each of the wind generators 100-1 and 100-2, terrain information of a place where each wind generator 100-1 and 100-2 is installed, and each wind power. At least one (INV) may be received from the position information on a location where the generators 100-1 and 100-2 are installed, and at least one INV may be stored in the memory 40-1.

FIGS. 11 and 12, the controller 50 uses a plurality of control values PA3-1 to PA3 stored in the memory 40 using input values T1-1, W1-1, and P1-1. A first pitch angle PA3-1, a first leading edge control value LE3-1, and/or a first trailing edge among -16, LE3-1 to LE3-16, and TE3-1 to TE3-16 The control value TE3-1 may be read, selected, or retrieved as the control values CTV.

FIG. 16 is a flow chart illustrating the operation of the energy conversion device shown in FIG. 1, 2, or 9. 1, 2, 9, and 16, a method of operating the energy conversion device 100 for converting mechanical energy obtained from a fluid flow into electrical energy is measured by the measuring device 300. When the flow is applied to the blade 200 by an external force, it measures the response of the blade 200, and generates a measurement value corresponding to the measurement result (S110).

The controller 500 reads a first control value from among control values stored in the memory 400 in response to the measured value output from the measuring device 300, and uses the first control value to generate a control signal CTRL. It generates (S130). The actuator 600 deforms the three-dimensional shape of the blade 200 in response to the control signal CTRL output from the controller 500 (S150).

Each of the control values stored in the memory 400 includes weather information around the energy conversion device 100, terrain information of a location where the energy conversion device 100 is installed, and a location where the energy conversion device 100 and other energy conversion devices are installed. It has different values according to at least one of the location information for.

FIG. 17 is a flow chart illustrating the operation of the energy conversion system shown in FIG. 10 or 12. 10, 12, and 17, the controller 50 receives at least one of weather information, terrain information, and location information through the receiver 70, and stores the received at least one memory 40 or 40. -1) to store it (S210).

The controller 50 reads a first control value among control values stored in the memory 40 or 40-1 in response to the at least one, and generates a control signal CTRL using the read first control value (S230). The actuator 60 deforms the three-dimensional shape of the blade in response to the control signal CTRL output from the controller 50 (S250).

As described with reference to FIGS. 1 through 17, the energy conversion device 100 for converting mechanical energy obtained from a fluid flow (or flow of fluid) into electrical energy includes a blade 200 or 200A, measuring devices. 300, memory 400, controller 500, and actuator 600. The measuring devices 300 measure the response of the blades 200 or 200A when the fluid flow is exerted on the blades 200 or 200A and generate measurements corresponding to the results of the measurements.

As described above with reference to FIGS. 3 through 8 and 11, the memory 400 includes first values representing an internal environment of the energy conversion device 100 and second values representing an external environment of the energy conversion device 100. Stores control values corresponding to a combination of the two values.

The controller 500 reads any one of the control values from the memory 400 in response to the measured values output from the measuring devices 300, and in response to the one of the read control values. Generate a control signal CTRL.

The actuator 600 deforms the three-dimensional shape of the blade 200 or 200A in response to the control signal CTRL output from the controller 500. The memory 400 may be a cache memory embedded in the controller 500.

The internal environment includes the position information of the blade 200 or 200A, the cumulative amount of generation of the energy conversion device 100, the cumulative fatigue life of the blade 200 or 200A, the cumulative amount of ultraviolet light of the blade 200 or 200A, and the blade 200. Or at least one of the remaining lifespan of 200A), but is not limited thereto. The measurement object described with reference to FIGS. 3 to 8 may also be included in the internal environment.

The controller 500 or 500A may update each of the control values stored in each lookup table LUT1 to LUT7 by using the internal environment of the energy conversion device 100. For example, the controller 500 or 500A may include predictive diagnosis technology, artificial intelligence (AI) technology, context awareness computing technology, cumulative power production of the energy conversion device 100, or energy. Each of the control values stored in each of the lookup tables LUT1 to LUT7 may be updated using the result of monitoring the state of the component of the converter 100.

The external environment may include first location information about a first location where the energy conversion device 100 is installed, second location information about a second location where the energy conversion device 100 and another energy conversion device are installed, and the first location. At least one of weather information for at least one of the second locations, and terrain information including the first location information and the second location information.

The controller 500 or 500A may update each of the control values stored in each of the lookup tables LUT1 to LUT7 by reflecting the external environment. In the present specification, the structure and operation of the wind power generators 100A, 100B, 100-1, and 100-2 are described as embodiments of the energy conversion device 100. However, the technical idea of the present invention can be applied as it is in the tidal generator and wave generator.

Although the present invention has been described with reference to the embodiments illustrated in the drawings, this is merely exemplary, and it will be understood by those skilled in the art that various modifications and equivalent other embodiments are possible. Therefore, the true technical protection scope of the present invention will be defined by the technical spirit of the appended claims.

INDUSTRIAL APPLICABILITY

The present invention can be used in an energy conversion device, a wind power generation system including the energy conversion device, and a method of operating the energy conversion device.

What is claimed is:

1. An energy conversion device for converting mechanical energy obtained from flowing fluids into electrical energy, comprised of:
   a plurality of blades;
   one or more measuring devices for measuring one or more parameters, each parameter representing an effect on the plurality of blades by fluids flow applied to the plurality of blades;
   a controller configured to generate one or more control signals corresponding to said one or more parameters, including at least one of a leading edge gap or a trailing edge gap of each of the plurality of blades; and an actuator configured to adjust one or more settings of each of the plurality of blades in reference to said one or more control signals generated from the controller, wherein said one or more settings includes at least one of the leading edge gap or the trailing edge gap of each of the plurality of blades.

2. The energy conversion device of claim 1, wherein the controller includes a memory for storing a fluid dynamics simulation program, which is at least one of a computational fluid dynamic (CFD) program or a finite element method (FEM) software, that, when executed, computes said one or more control signals based on said one or more parameters measured by said one or more measuring devices.

3. The energy conversion device of claim 1, wherein the flowing fluids is at least one of a fluidic movement of gas, fluidic movement of particles, fluidic movement of liquids and fluidic movement of solid materials.

4. The energy conversion device of claim 1, wherein each blade of the plurality of blades used in the energy conversion device comprises a body and at least one of an adjustable leading edge and an adjustable trailing edge.

5. The energy conversion device of claim 1, wherein each blade of the plurality of blades comprises a body that is made of a plurality of attachable and detachable parts.

6. The energy conversion device of claim 1, wherein said one or more parameters measured by said one or more measuring devices comprises at least one of restoration force of the plurality of blades, elasticity of the plurality of blades, aeroelasticity of the plurality of blades, fatigue load on the plurality of blades, vibration of the plurality of blades, stress on the plurality of blades, weight of the plurality of blades, buoyancy of the plurality of blades, rotational speed of the plurality of blades, pitch angle of the plurality of blades, strain on the plurality of blades, acceleration of the plurality of blades, the amount of ultraviolet light on the plurality of blades, the amount of solar radiation on the plurality of blades, the speed of the fluid flow, the temperature of the plurality of blades, and the humidity of an environment where the plurality of blades is placed.

7. The energy conversion device of claim 1, wherein said one or more settings of each of the plurality of blades adjusted by the actuator includes a pitch angle of each of the plurality of blades.

8. The energy conversion device of claim 1, wherein at least one adjustable leading edge is attached to a body of each of the plurality of blades, and said one or more settings adjustable by the actuator includes at least one of opening and closing of the leading edge, a gap between the leading edge and the body of the blade and an angle between the leading edge and the body of the blade.

9. The energy conversion device of claim 1, wherein at least one adjustable trailing edge is attached to a body of each of the plurality of blades, and said one or more settings adjustable by the actuator includes at least one of opening and closing of the trailing edge, a gap between the trailing edge and the body of the blade and an angle between the trailing edge and the body of the blade.

10. The energy conversion device of claim 1, wherein the controller is configured to adjust said one or more control signals using at least one of the following: location of the energy conversion device, weather information of the location of the energy conversion device, and terrain information at the location where the energy conversion device is installed.

11. The energy conversion device of claim 1, wherein the controller is configured to adjust said one or more control signals using at least one of the following: location of an installation site of another energy conversion device, weather information of the other energy conversion device, and terrain information at the location where the other energy conversion device is installed.

12. The energy conversion device of claim 1, wherein each blade of the plurality of blades comprises an enclosed internal compartment for storing a material that has a lower density than an external environment of the blade.

13. The energy conversion device of claim 1, wherein each blade of the plurality of blades comprises an enclosed internal compartment for storing a material that has a fluid.

14. An energy conversion device for converting mechanical energy obtained from flowing fluids into electrical energy, comprised of:
 a plurality of blades in which each blade of the plurality of blades has a body, and an adjustable leading edge or an adjustable trailing edge;
 a measuring device for measuring response of the plurality of blades and generating one or more of primary measured values associated to the plurality of blades when a fluid flow is applied to the plurality of blades;
 a database storing a list of parameters corresponding to a pitch angle, a leading edge angle, a leading edge gap, a trailing edge angle and a trailing edge gap of the plurality of blades;
 an actuator for adjusting the pitch angle, the leading edge angle, the leading edge gap, the trailing edge angle and the trailing edge gap of the of the plurality of blades; and
 a controller provided with a memory storing a fluid dynamics simulation program that, when executed, receives said one or more primary measured values, queries the database to retrieve a set of parameters corresponding to said one or more primary measured values, and providing a control signal representative of the set of parameters to the actuator to adjust at least one of the pitch angle, the leading edge angle, the leading edge gap, the trailing edge angle and the trailing edge gap of the plurality of blades.

15. The energy conversion device of claim 14, wherein said one or more of primary measured values comprise at least one of restoration force of the plurality of blades, elasticity of the plurality of blades, aeroelasticity of the plurality of blades, fatigue load on the plurality of blades, vibration of the plurality of blades, stress on the plurality of blades, weight of the plurality of blades, buoyancy of the plurality of blades, rotational speed of the plurality of blades, pitch angle of the plurality of blades, strain on the plurality of blades, acceleration of the plurality of blades, and the temperature of the plurality of blades.

16. The energy conversion device of claim 14, wherein the fluid dynamics simulation program is further configured to receive one or more of secondary measured values from a secondary measuring device, said one or more of secondary measured values comprising at least one of location information of the secondary measuring device, weather information around the secondary measuring device, and terrain information of the location where the secondary measuring device is installed.

17. The energy conversion device of claim 16, wherein the secondary measuring device is a part of the measuring device provided in the energy conversion device.

18. The energy conversion device of claim 16, wherein the secondary measuring device is a part of a measuring device provided in a different energy conversion device located at another location.

19. A fluid power generation system, comprising:
- a first fluid power generator provided with a first set of blades and a first actuator for adjusting one or more configurations of the first set of blades;
- a second fluid power generator provided with a second set of blades and a second actuator for adjusting one or more configurations of the second set of blades;
- a measuring device for generating fluid power values by measuring speed of wind blowing onto the first set of blades and the second set of blades;
- a remote weather information transmitter for collecting weather information and transmitting the weather information;
- a memory provided with a fluid dynamic simulation program;
- a controller configured to execute the fluid dynamic simulation program to obtain control values corresponding to the fluid power values from the measuring device and the weather information transmitted from the weather information transmitter, and obtain a first set of control signals for the first actuator and a second set of control signals for the second actuator, wherein each of the first set of control signals and the second set of control signals includes at least one signal for controlling a leading edge gap or a trailing edge gap of respective set of blades, wherein the first actuator re-configures at least one of a pitch angle, a leading edge, the leading edge gap, a trailing edge and the trailing edge gap of each of the first set of blades based on the first set of control signals, and wherein the second actuator re-configures at least one of a pitch angle, a leading edge, the leading edge gap, a trailing edge and the trailing edge gap of each of the second set of blades based on the second set of control signals.

20. The fluid power generation system of claim 19, wherein each blade of the first set of blades and the second set of blades comprises a plurality of attachable and detachable parts, each of the attachable parts and the detachable parts comprises an enclosed internal compartment for storing a material that has a lower density than an external environment of the blade.

* * * * *